Dec. 17, 1963 H. F. SHILLING 3,114,530
QUICK DETACHABLE REAR VIEW MIRROR ASSEMBLY FOR AUTOMOBILES
Filed Jan. 15, 1962
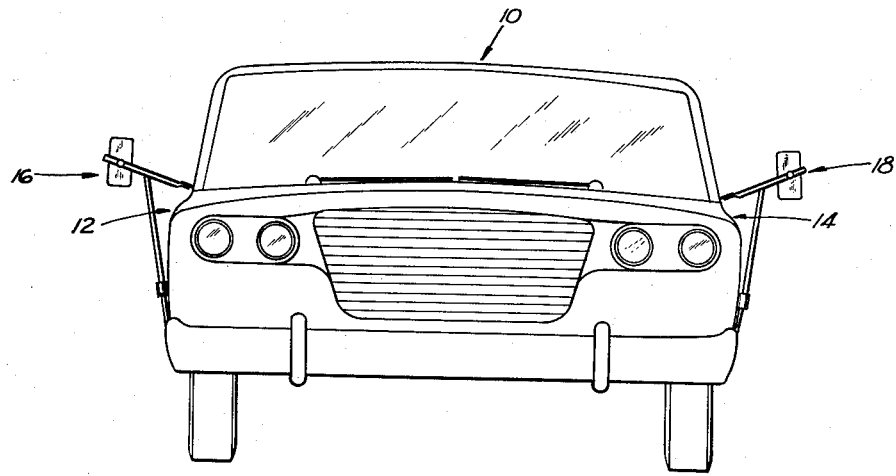
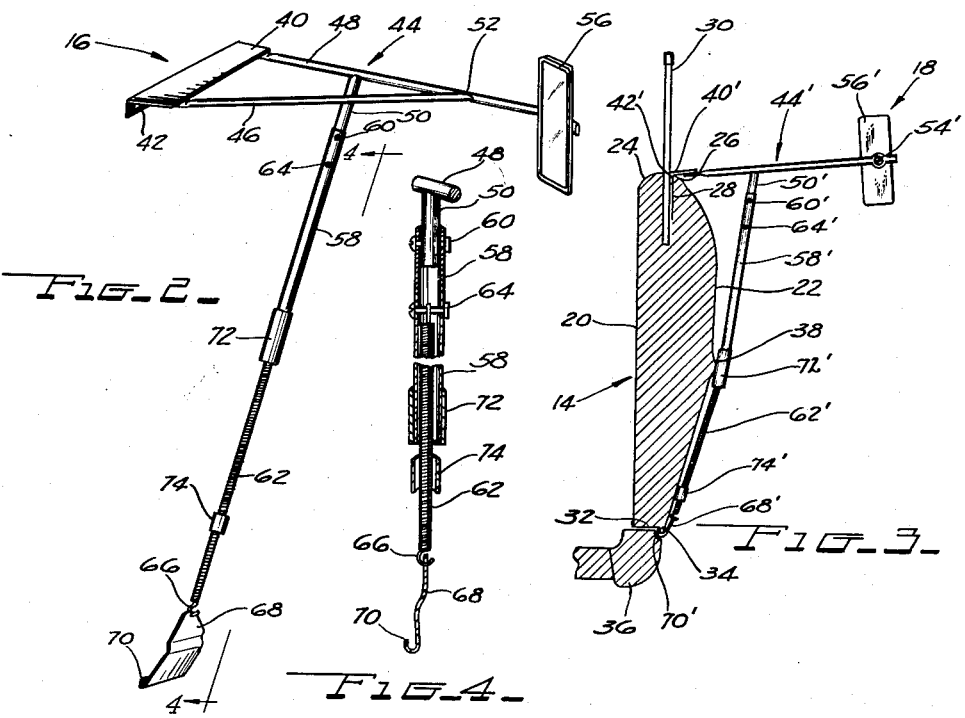
INVENTOR
Harvey F. Shilling
BY Roy A. Plant
ATTORNEY

United States Patent Office 3,114,530
Patented Dec. 17, 1963

3,114,530
QUICK DETACHABLE REAR VIEW MIRROR
ASSEMBLY FOR AUTOMOBILES
Harvey F. Shilling, 317 N. Hillsdale St., Homer, Mich.
Filed Jan. 15, 1962, Ser. No. 166,228
8 Claims. (Cl. 248—226)

This invention pertains to a rear view mirror support mechanism and, in particular, to an outside rear view mirror support mechanism adapted to be readily removably mounted on the exterior of a vehicle door and, upon removal from such door, readily disassemblable for transport or storage.

A great number, if not the majority, of non-commercial automotive passenger vehicles in use today are equipped with an outside rear view mirror including mounting means therefor secured to the left front door or left front fender of the vehicle to provide the operator of the vehicle with a view of the road to the rear of the vehicle. In some instances, a mirror including its mounting means is also secured in a similar place and fashion on the right side of the vehicle to provide the vehicle operator with an additional field of view to the rear of the vehicle. Irrespective of whether or not one or two mirrors are employed as aforedescribed, the mirror mounting means employed typically comprises a relatively small or short bracket which disposes the mirror itself closely adjacent if not in line with the sides of the vehicle itself. Such rear view mirror installations have contributed greatly to the safety of operation of non-commercial passenger vehicles for various reasons which will be obvious to those acquainted with this art, and including the fact that they provide a greater range of rear vision than is provided by the conventional inside rear view mirror and permit the vehicle operator to be appraised of vehicles driving or passing in lanes adjacent to either side of his vehicle.

To an increasing extent each year, more and more operators of passenger vehicles of the type aforementioned have the occasion to hitch thereto and tow various types of trailers such as, for example, house trailers, boat trailers and general hauling trailers which are often of appreciably greater width than the width of the passenger vehicle itself. As a result, the operator of the passenger vehicle is unable to obtain a clear view, if any view at all, of the road behind his vehicle and the trailer in question. The implications of this condition from a safety standpoint will be obvious.

Being faced with these circumstances, the operator of a passenger vehicle towing such a trailer has been faced with two alternatives, both of which are highly unsatisfactory. The first involves merely tolerating the limited or completely obstructed field of rear vision, while the second requires drilling or otherwise working on the sheet metal of the vehicle to mount only temporarily a second rear view mirror and support mechanism therefor which will project sufficiently far out-upwardly from the side of the vehicle as to provide a clear field of rear vision alongside and to the rear of the towed trailer. However, since trailers of the type aforementioned are towed during a relatively limited portion of the total period of use of the passenger vehicle, it will be readily apparent that the vehicle operator will remove the extending mirror support mechanism aforedescribed upon unhitching the towed trailer because the extending mirror is no longer required, it is relatively unsightly and presents side-clearance problems for the passenger vehicle. It was a recognition of these and other problems in this art which led to the conception and development of the present invention.

Therefore, the objects and features of the present invention include the provision of an extended auxiliary outside rear view mirror support mechanism which may be readily mounted on a side door of a passenger vehicle for use while the latter is towing a trailer, and then readily removed from such vehicle door when the trailer is unhitched from the vehicle.

It is yet another object and feature of this invention to provide an outside rear view mirror support mechanism of the type aforementioned which may be readily removably mounted on the exterior of a vehicle door without drilling holes or otherwise providing any special attaching brackets or fixtures to the door whereby, upon removal of the mirror support mechanism, there are no attaching holes, mounting brackets or the like to mar the styling of the vehicle.

It is yet another object and feature of this invention to provide an outside rear view mirror support mechanism of the type aforementioned which may be wholly removably mounted on the exterior of a vehicle door without the necessity of marring the styling or finish of the door by drilling holes or the like for attaching any special supporting mechanisms, and in which the entire mirror support mechanism is movable with the door as the latter is opened and closed.

It is yet another object and feature of this invention to provide an outside rear view mirror support mechanism adapted to be removably mounted on the exterior of a vehicle door so as to support a mirror a considerable distance to one side of the vehicle door, and characterized by mirror support means removably mountable upon the window sill of the door, a retaining plate removably engageable with the bottom edge of the door, and yieldable spring means operatively connected between said mirror support means and said retaining plate, said spring means being placed in tension upon mounting the mirror mounting means on the window sill and retaining plate on the bottom edge of the door so as to removably mount and hold the entire mirror support mechanism on the vehicle door.

Yet another object and feature of this invention is to provide an outside rear view mirror support mechanism of the type aforementioned adapted to be removably mounted on the exterior of a vehicle door between the window sill and bottom edge thereof which, upon removal from said door, is readily dismantlable to facilitate storage or transport thereof.

Still further objects, features and advantages of the invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but one of various ways in which the principle of the invention may be used.

In the annexed drawing:

FIGURE 1 is a front elevation of a non-commercial passenger vehicle having the left and right front doors thereof equipped with a preferred embodiment of the present invention;

FIGURE 2 is a perspective view of a rear view mirror support mechanism constructed in accordance with this invention, and adapted for mounting on the right front door of a vehicle as illustrated in FIGURE 1;

FIGURE 3 is an enlarged view, partially in section, of the rear view mirror support mechanism mounted on the left front door of the vehicle of FIGURE 1, and looking from the front of the vehicle toward the rear thereof; and FIGURE 4 is an enlarged fragmentary sectional view taken on line 4—4 of FIGURE 2.

Referring now to the drawing, the numeral 10 indicates a non-commercial passenger vehicle equipped with the usual hinged right and left front doors 12 and 14, respectively, and right and left outside rear view mirror support mechanisms 16 and 18 removably mounted, respectively, on the right and left front doors of the vehicle. As will be appreciated, the right and left front doors of the vehicle are substantial duplicates. Accordingly, only the left front door 14 is shown in detail in FIGURE 3, and it comprises inner and outer body panels 20 and 22, respectively, a window sill comprising the inner and outer sill portions 24 and 26, respectively, defining the usual elongate window-receiving opening 28 therein in which the window 30 is vertically adjustably mounted by means of any suitable window regulating mechanism, not shown. The bottom edge 32 of the door including the usual depending longitudinally elongate flange 34 is adapted to cooperate with a sill portion 36 of the automotive vehicle frame or chassis in the usual manner in opening or closing the door. The numeral 38 indicates a longitudinal extending protusion on the outer body panel 22 of the door as may be formed by shaping the body panel itself or attaching a trim strip thereto for styling purposes.

As will appear more fully hereinafter, the right and left outside rear view mirror support mechanisms 16 and 18 are substantially identical except for the relative positioning of certain parts to permit mounting on the respective doors. Accordingly, the following description of the outside rear view mirror support mechanisms will make primary reference to FIGURES 2 and 4 illustrating the support mechanism 16 mounted on the right side of the vehicle illustrated in FIGURE 1, it being understood that like numerals primed are utilized in FIGURE 3 to indicate corresponding parts of the outside rear view mechanism 18 mounted on the left side of the vehicle.

Thus, each of the mirror support mechanisms 16 and 18, and referring specifically to that mechanism 16 mounted on the right side of the vehicle and illustrated in FIGURES 2 and 4, comprises a flat metal mounting plate 40 adapted to be removably mounted upon the outer sill portion 26 of each vehicle door, and including an integral laterally projecting lip portion 42 adapted to be removably insertable within the window-receiving opening 28 of each door between the window 30 movable therein and the outer sill portion 26 of each door to hold the mounting plate on each of the window sills. A suitable mirror support means, indicated generally at 44, is rigidly secured to the mounting plate 40 and is shown as comprising the tubular rods 46, 48 and 50 which are preferably hollow for rigidity and to reduce weight thereof. One end of each of the tubular rods 46 and 48 is suitably rigidly secured as by welding, brazing, riveting or the like to opposite ends of the mounting plate 40, with the longer rod 48 extending outwardly and generally perpendicularly therefrom and the shorter rod 46 converging on the rod 48 and being suitably connected as by welding, brazing, or the like rigidly thereto, as indicated at 52. The outer end of the rod 48 is provided with a suitable connection 54' as shown in FIGURE 3, such as the well known ball and socket mounting for the rear view mirror assembly 56. The tubular rod 50 is also rigidly secured as by welding, brazing, or the like to the rod 48 between its connection to the mounting plate and its connection to the other tubular rod 46, and depends a short distance from the rod 48 substantially in the vertical plane containing the rod 48.

A hollow tubular rod 58 includes an upper end adapted to be removably telescopically mounted about the lower end of the hollow tubular rod 50, there being provided suitable fastening means such as the nut and bolt assembly 60 for detachably connecting the respective ends of the tubular rods 50 and 58 together. A coiled spring 62 is contained within the hollow tubular rod 58 and has one end thereof connected by any suitable means, such as another nut and bolt assembly 64, to the hollow tubular rod 58 below the lower end of the tubular rod 50 and the nut and bolt assembly 60. The spring 62 extends through the hollow tubular member 58 and out of the lower end thereof, and is provided with a hook 66 or other suitable means for removable insertion within a suitable aperture in the upper end of a retaining plate 68 including a locking lip or flange 70 adapted to be removably engaged with the bottom edge 32 and flange 34 of each front door. A suitable member of cushioning devices, herein shown to be two in number and in the form of tubular rubber bumpers 72 and 74, are respectively adjustably slidably mounted on the exterior surface of the tubular rod 58 and the spring 62. It will be understood that these bumpers are positionable for engagement with the other body panel 22 of each vehicle door or perhaps trim strips mounted thereon as indicated at 38 to prevent marring the finish of the vehicle door or such trim.

In describing the installation of the rear view mirror support mechanisms 16 and 18, reference will be made particularly to the left front door 14 and the mirror support mechanism 18 therefor, FIGURE 3, it being understood that the respective mirror support mechanisms are mounted in identical fashion on the respective doors. In this regard, and as will now be apparent, the mirror support mechanisms 16 and 18 differ from each other only with respect to the relative disposition of the mounting plates 40 and 40' and components of the mirror support means 44 and 44', these assemblies being merely mirror images of each other adapted for mounting on the respective front side doors of the vehicle.

Thus, the left outside rear view support mechanism 18, FIGURE 3, may be readily removably mounted on door 14 by mounting the mounting plate 40' on the outer sill portion 26 of the door, with the lip portion 42' of the mounting plate extending into the window-receiving opening 28 between the window 30 therein and the outer sill portion. The retaining plate 68' and locking lip or flange 70' are then mounted in engagement with the bottom edge 32 and flange 34 of the door resulting in tensioning of spring 62' so as to firmly clamp the mounting plate 40' in position on the window sill. In so attaching retaining plate 68', the rubber bumpers 72' and 74' are adjusted as required to prevent marring or otherwise damaging the finish of the door. The mirror support means 44' will then extend outwardly from the door of the vehicle to a sufficient extent whereby, upon proper adjustment of the mirror assembly 56' carried thereon, a clear unobstructed view to the rear of the vehicle and any trailer towed thereby will be afforded.

When the mirror support mechanism 18 is no longer required, the retaining plate 68' is detached from the bottom edge and flange of the door and the mounting plate 40' and lip portion 42' thereof withdrawn from the window sill. Thereafter, to enhance storage or transport of the mirror support mechanism, the nut and bolt assembly 60' may be disconnected, and the rod 58', spring 62' and retaining plate 68' withdrawn from the mirror support means 44' as a unit. Furthermore, the retaining plate 68' may be easily detached from the lower end of the spring 62'.

While but one form of the invention has been shown and described, other forms will now be apparent to those skilled in the art. Therefore, it will be understood that the embodiment shown in the drawing and described above is merely for illustrative purposes, and is not intended to limit the spirit and scope of the invention as described and illustrated.

Other modes of applying the principle of my invention may be employed instead of the one explained, change being made as regards the mechanism or components thereof herein disclosed, provided the means stated by any of the following claims or the equivalent of such stated means be employed.

I therefore particularly point out and distinctly claim as my invention:

1. An outside rear view mirror support mechanism adapted to be removably mounted on the exterior of a vehicle door of the type including a window sill and a bottom edge of said door spaced below said window sill; said support mechanism comprising mirror support means removably mountable upon said window sill, a hollow tubular member having its upper end connected to said mirror support means and having its lower end depending therefrom with said mirror support means mounted on said window sill, a spring extending through said tubular member and having one end thereof connected to said tubular member, the other end of said spring extending out of the lower end of said tubular member, and retaining means connected to the other end of said spring and being removably engageable with said bottom edge of said door to place said spring in tension with said mirror support means on said window sill to hold said support mechanism on said door.

2. An outside rear view mirror support mechanism adapted to be removably mounted on the exterior of a vehicle door of the type including a window sill and a bottom edge of said door spaced below said window sill; said support mechanism comprising mirror support means removably mountable upon said window sill, a hollow tubular member having upper and lower ends, means detachably connecting said upper end of said tubular member to said mirror support means, a spring extending through said tubular member and having one end thereof connected to said tubular member beneath the connection of the latter to said mirror support means, the other end of said spring extending out of the lower end of said tubular member, and retaining means connected to the other end of said spring and being removably engageable with said bottom edge of said door to place said spring in tension with said mirror support means mounted on said window sill to hold said support mechanism on said door.

3. An outside rear view mirror support mechanism adapted to be removably mounted on the exterior of a vehicle door of the type including a window sill and a bottom edge of said door spaced below said window sill; said support mechanism comprising mirror support means removably mountable upon said window sill and including a first tubular member fixed thereto and having a lower end depending therefrom with said mirror support means mounted on said window sill, a second hollow tubular member having an upper end telescopically mounted relative to said lower end of said first tubular member, means detachably connecting said lower end of said first tubular member to said upper end of said second tubular member, a spring extending through said second tubular member and having one end thereof connected to said second tubular member beneath the lower end of said first tubular member, the other end of said spring extending out of the lower end of said second tubular member, and retaining means connected to the other end of said spring and being removably engageable with said bottom edge of said door to place said spring in tension with said mirror support means mounted on said window sill to hold said support mechanism on said door.

4. An outside rear view mirror support mechanism adapted to be removably mounted on the exterior of a vehicle door of the type including a window sill having inner and outer sill portions defining a window-receiving opening therein, and a bottom edge of said door spaced below said window sill; said support mechanism comprising mirror support means including a mounting plate removably mountable upon said outer sill portion and having a lip portion removably insertable within said window-receiving opening between a window therein and said outer sill portion to hold said mirror support means on said window sill, a hollow tubular member having upper and lower ends, means detachably connecting said upper end of said tubular member to said mirror support means, a spring extending through said tubular member and having one end thereof connected to said tubular member beneath the connection of the latter to said mirror support means, the other end of said spring extending out of the lower end of said tubular member, and retaining means connected to the other end of said spring and being removably engageable with said bottom edge of said door to place said spring in tension with said mirror support means mounted on said window sill to hold said support mechanism on said door.

5. An outside rear view mirror support mechanism adapted to be removably mounted on the exterior of a vehicle door of the type including a window sill having inner and outer sill portions defining a window-receiving opening therein, and a bottom edge of said door spaced below said window sill; said support mechanism comprising a mounting plate removably mountable upon said outer sill portion and including a lip portion removably insertable within said window receiving opening between a window therein and sad outer sill portion to hold said mounting plate on said window sill, mirror support means rigidly secured to and extending outwardly from said mounting plate with the latter mounted upon said window sill and including a first tubular member fixed thereto and having a lower end depending therefrom with said mounting plate mounted on said window sill, a second hollow tubular member having an upper end telescopically mounted about said lower end of said first tubular member, means detachably connecting said lower end of said first tubular member to said upper end of said second tubular member, a coiled spring extending through said second tubular member and having one end thereof connected to said second tubular member beneath the lower end of said first tubular member, the other end of said spring extending out of the lower end of said second tubular member, a retaining plate connected to the other end of said spring and being removably engageable with said bottom edge of said door to place said spring in tension with said mounting plate mounted on said sill, and adjustable bumper means mounted respectively about said second tubular member and the lower end of said spring for engagement with the exterior of said door.

6. The outside rear view mirror support mechanism as defined in claim 1 further comprising bumper means adjustably mounted about said hollow tubular member for adjustable movement between the upper and lower ends of the latter and engagement with the exterior of said door.

7. The outside rear view mirror support mechanism as defined in claim 1 further comprising bumper means adjustably mounted about said spring for adjustable movement between the other end thereof and the lower end of said tubular member and engagement with the exterior of said door.

8. The outside rear view mirror support mechanism as defined in claim 1 further comprising bumper means adjustably mounted about said hollow tubular member for adjustable movement between the upper eand lower ends of the latter and engagement with the exterior of said door, and bumper means adjustably mounted about said spring for adjustable movement between the other end thereof and the lower end of said hollow tubular member and engagement with the exterior of said door.

References Cited in the file of this patent

UNITED STATES PATENTS

| | | |
|---|---|---|
| 1,593,834 | McNeal | July 27, 1926 |
| 1,919,271 | Cady | July 25, 1933 |
| 2,098,388 | Hruska | Nov. 9, 1937 |
| 2,259,179 | Sauer | Oct. 14, 1941 |
| 2,484,401 | Coie | Oct. 11, 1949 |
| 2,518,538 | Giblin | Aug. 15, 1950 |
| 3,011,818 | Matthiessen | Dec. 5, 1961 |

UNITED STATES PATENT OFFICE
CERTIFICATE OF CORRECTION

Patent No. 3,114,530                        December 17, 1963

Harvey F. Shilling

It is hereby certified that error appears in the above numbered patent requiring correction and that the said Letters Patent should read as corrected below.

Column 4, line 14, for "other" read -- outer --; column 6, line 20, for "sad" read -- said --.

Signed and sealed this 26th day of May 1964.

(SEAL)
Attest:

ERNEST W. SWIDER                      EDWARD J. BRENNER
Attesting Officer                      Commissioner of Patents